United States Patent [19]

Bahr et al.

[11] 4,395,715

[45] Jul. 26, 1983

[54] METHOD AND ARRANGEMENT FOR CONTROLLING THE PRINT CURRENT IN METAL PAPER PRINTERS

[75] Inventors: Dietrich J. Bahr, Herrenberg; Gottfried A. Goldrian, Böblingen, both of Fed. Rep. of Germany

[73] Assignee: International Business Machines Corporation, Armonk, N.Y.

[21] Appl. No.: 296,662

[22] Filed: Aug. 27, 1981

[30] Foreign Application Priority Data

Sep. 20, 1980 [DE] Fed. Rep. of Germany ..... 80105659

[51] Int. Cl.$^3$ .......................... G06K 15/10; B41J 3/10
[52] U.S. Cl. .................................... 346/1.1; 346/135.1
[58] Field of Search ................. 346/1.1, 76 R, 76 PH, 346/135.1; 400/120

[56] References Cited

U.S. PATENT DOCUMENTS

| | | | |
|---|---|---|---|
| 1,825,551 | 9/1931 | Serrell | 346/1.1 |
| 3,122,448 | 2/1964 | Hills et al. | 346/135.1 |
| 3,185,995 | 5/1965 | Dickens | 346/1.1 |
| 3,265,531 | 8/1966 | Pribble | 346/135.1 |

FOREIGN PATENT DOCUMENTS 55-115185  4/1980  Japan .................................... 400/120

*Primary Examiner*—Donald A. Griffin
*Attorney, Agent, or Firm*—Kenneth P. Johnson

[57] ABSTRACT

For record carriers with a greatly varying thickness of the metal layer, the burn out process is effected dynamically with respect to the current strength. During the starting phase up to the beginning of the actual arcing phase a relatively high current is applied which is sufficient to burn out even thick metal layers. As burning out proceeds, the print current, after a particular arc voltage has been reached, is reduced in a short time, maintaining the arc and avoiding an undesirable burning out which would increase the print spot. For thinner metal layers the burn out current is correspondingly lower. The maximum burn out current is automatically adjusted to the thickness of the metal layer by measuring the arc voltage between electrode and metal surface of the record carrier. Suitable arrangements for controlling the burn out current are characterized by an (arc) voltage-controlled current control circuit.

13 Claims, 5 Drawing Figures

METHOD AND ARRANGEMENT FOR CONTROLLING THE PRINT CURRENT IN METAL PAPER PRINTERS

BACKGROUND OF THE INVENTION

The invention concerns a method and arrangements for controlling the print current in metal paper printers. It is known for information recording in metal paper printers to be effected by applying a voltage, in the course of which an arc is formed, between a print electrode and a record carrier provided with a thin metallized layer. This arc causes the metal layer of the record carrier to be burnt out at the position of the electrode.

Conventional driver circuits for supplying the print voltage and the print current, respectively, were provided with a switching transistor comprising a current limiting resistor. By means of this original solution relatively thin metal layers could be satisfactorily burnt out but with thicker metal layers defects (areas which were not burnt out) were encountered. The cause of such defects was that the maximum current (as a result of the current limiting resistor at a predetermined voltage) was insufficient. A corresponding increase of the print voltage and thus of the print current, however, would have led to thinner metal layers being unduly and excessively burnt out. Thus, for metal papers with a greater tolerance range for the thickness of the vapor deposited metal layer the print quality would have been insufficient: either as a result of defects in the thicker areas of the metal layer or as a result of excessively burnt out areas in the thinner regions of the metal layer.

OBJECTS AND SUMMARY OF THE INVENTION

It is a primary object of this invention to provide a current supply circuit for marking electrodes of a metal paper printer which can insure an adequate print quality at varying thicknesses of the metal layer.

Another object of this invention is to provide a current supply circuit for metal paper printer electrodes in which the marking current at the electrode-paper junction is initially a large value at the striking of an arc and diminishes during completion of the burning out process.

A further object of this invention is to provide a current control circuit for marking metal paper via print electrodes which can control the current supplied to the electrodes in accordance with the voltage sensed at the electrode paper junction, which circuit is readily adapted to integrated circuit fabrication techniques.

The foregoing objects are attained in accordance with the principles of the invention by providing current supply means between a potential source and the marking electrode of a metal paper printer in which current flow of the supply means is started by control means responsive to an initiating signal and to the voltage sensed at the electrode paper interface which is effective at a predetermined voltage to decrease the current flow through the supply means to thereby limit the current during the remainder of the burning out process. The automatic control becomes immediately affective once the arc is struck to thereby prevent overburning at the eroded mark. By controlling the current supply with the voltage sensed at the mark to be burned, variable thicknesses of metal can be eroded with varying quantities of current but, in any case, without enlarging a mark size beyond that desired.

The foregoing and other objects, features and advantages of the invention will be apparent from the following more detailed description of the preferred embodiments of the invention, as illustrated in the accompanying drawing.

DESCRIPTION OF PREFERRED EMBODIMENTS

Figure 1:
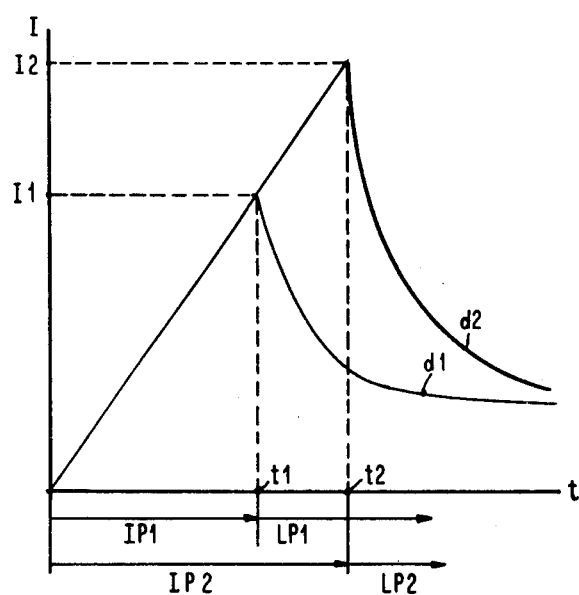
FIG. 1 is a waveform of controlled print current as a function of time for a thin and a thick metal layer, during a burning-out process in accordance with the invention.

FIG. 1 shows how the print current is to be controlled as a function of the time t. The rise of the current up to its maximum value corresponds to the so-called starting phase of the arc. After the arc has been started and the maximum current been reached, the metal layer is to be burnt out in a controlled manner, using a rapidly decreasing current. The starting of the arc necessitates a very high current which may be as high as ten times the value of the arc current. This starting current must increase at a defined rate and drop to lower values once the arc has been started. The satisfactory starting of the arc is indicated by the electrode voltage. Prior to starting the arc, the print electrode rests on the metal layer of the record carrier and thus is grounded. At the time the arc is started, the electrode has a negative voltage, as is required for arcing. This voltage is detected by a circuit for the further control of the arc. The current curve desired during the starting phase of the arc and during the subsequent actual arcing phase is shown in FIG. 1 both for a thin metal layer (parameter d1) and a thick metal layer (parameter d2). For d1 the current during phase IP1 initially rises up to a maximum value I1, as is required for forming an arc. The current reaches this value at the time t1. To ensure that the burning out of the metal layer proceeds in a controlled manner, the current is subsequently immediately decreased to lower values.

For thicker metal layers corresponding to d2 the arc is formed only at a higher current value, designated as I2, at the time t2, after which the arc current is decreased for the further controlled burning out of the metal layer.

The rise time of the current up to the formation of an arc corresponds to t1 (starting phase IP1) and t2, respectively, (starting phase IP2). The subsequent actual arcing phase for a controlled burning out of the metal layer is designated as LP1 and LP2, respectively.

Figure 2A:
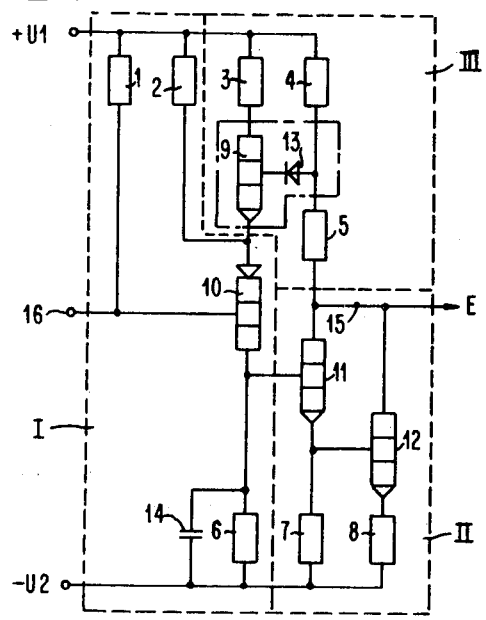
FIG. 2A is a circuit diagram of a first circuit for controlling the print current in metal paper printers.

FIG. 2A shows a circuit, by means of which the current curve illustrated in FIG. 1 can be realized by controlling the arc current. This circuit consists of three parts: Part I which is used to actually control the current, part II which is used as an emitter follower and part III which has the function of a current switch.

In the switched off state, a positive voltage of, for example, +5 volts is applied to the input 16 of the circuit. This voltage in conjunction with the series-connected transistors 9 (npn type) and 10 (pnp type) is to inhibit said transistors. Transistor 10 is switched on by a negative input pulse at the input 16. As transistor 9 is positively biased via the diode 13 and the voltage divider made up of resistors 4 and 5, transistor 9 is made conductive in response to a negative input pulse. The current subsequently flowing is the maximum collector current possible for transistor 10. The magnitude of this current is determined by resistors 2 and 3. (The resistor 2 is connected in parallel to the collector resistor 3 of transistor 9). Capacitor 14, which is connected in parallel to the collector resistor 6 of transistor 10, is charged by means of this current. From a particular threshold value of, say, 1.5 volt onwards a current flows through power transistor 12. The magnitude of this current is determined by the emitter resistor 8.

For the voltage supply of the circuit, the end of collector resistor 3 remote from transistor 9 is connected to a positive voltage +U1, of, for example, +5 volts, and the end of the collector resistor remote from transistor 10 to a negative voltage −U2, of, for example, −42 volts.

The line 15 is connected to the print electrode E. The latter rests on the metal layer of the record carrier. If the current density at the electrode/metal layer interface reaches a critical value, a hole in the metal layer and a negative arc voltage are formed. This negative voltage is detected by the circuit via line 15; it inhibits the diode 13 via the voltage divider made up of resistors 5 and 4, thus switching off the transistor 9.

At this time the current through transistor 10 is determined only by the highly resistive resistor 2; it drops to a fraction of the old value (at which there was a current flow through transistor 9). The capacitor 14 is discharged down to a voltage determined by resistor 6. The current across transistors 11 and 12 forming an emitter follower follows this voltage until discontinuence of the arc prevents any further current flow.

Thus, as a result of this circuit, the burning out process is dynamic with respect to the current strength of the arc. At the beginning of burning out a relatively high current is applied which is sufficient for burning out even the thickest metal layers. As burning out proceeds, the print current is reduced in the shortest possible time after a particular arc voltage has been reached, so that the arc is still maintained, while avoiding an undesirable excessive buring out of the print spot. For thinner metal layers the maximum current occurring during the starting phase has to be lowered earlier than for thicker metal layers. Automatic adjustment of the maximum burning current to the thickness of the metal layer is effected by measuring the arc voltage between the electrode and the metal layer. In this manner it is possible to use metal paper with a greatly varying thickness of the metal layer and to achieve a satisfactory print quality.

The circuit shown in FIG. 2A has been tested. It functions satisfactorily as long as the diode 13 is correspondingly "slow". This means, the inverse current of the diode 13 must exceed the depletion current of the base of transistor 9, because otherwise there would be oscillations preventing the circuit from functioning as required.

Figure 2B:
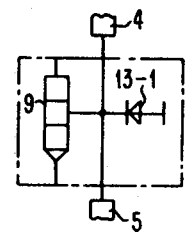
FIG. 2B is a representation of a circuit part for modifying the circuit in accordance with FIG. 2A for eliminating electrical oscillations.

This critical behavior of the circuit shown in FIG. 2A, which is encountered when diode 13 is not appropriately chosen, can be avoided by replacing the dash-dotted circuit part of FIG. 2A by that shown in FIG. 2B. According to FIG. 2B, the base of transistor 9 is directly connected to the tap between resistors 4 and 5, and this tap is grounded via a diode 13-1.

Figure 3:
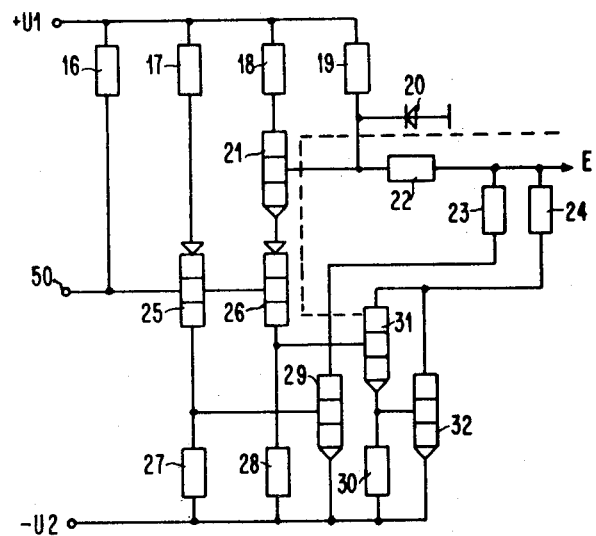
FIG. 3 is a circuit diagram of a second circuit for controlling the print current in metal paper printers.
Figure 4:
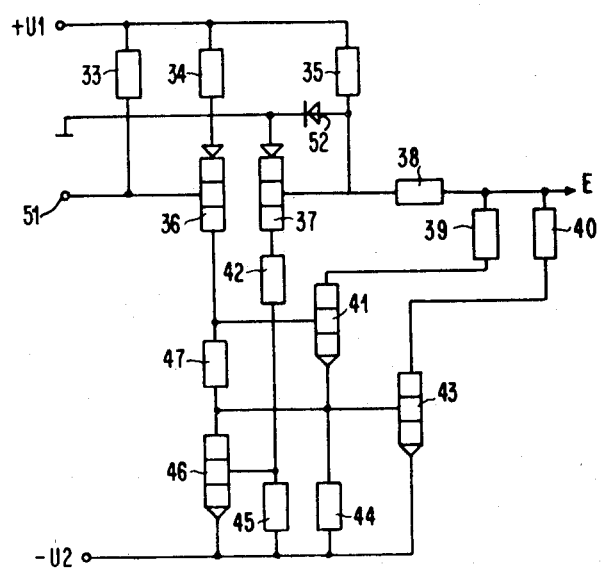
FIG. 4 is a circuit diagram of a third circuit for controlling the print current in metal paper printers.

Whereas the power dissipation of the circuit described in FIG. 2A and 2B, respectively, is relatively high, the power dissipation in the circuits of FIGS. 3 and 4 is low, thus permitting integration.

Whereas in the circuit of FIG. 2A the transistor 12 supplies an impressed current to the electrode E, transistor 32 of FIG. 3, by comparison, is saturated. The emitter of the latter transistor is directly connected to a voltage −U2 (of, for example, −42 volts); the magnitude of the transistor current is determined by the resistor 24 and the voltage occurring at electrode E. This voltage reduces the current flowing through transistor 32. For starting the arc, transistor 31 is additionally connected (input signal at terminal 50), the current of which superimposes the current flowing through transistor 32. An additional increase of the starting current is ensured by transistor 29 which is switched on for starting the arc and the current of which is determined by the collector resistor 23. Upon application of an input signal to terminal 50, currents flow across transistors 25 and 26, making transistors 29 and 32 conductive. Upon the occurrence of a particular electrode voltage, transistor 31 is switched off along the dotted path, thus inhibiting transistor 32.

The circuit part consisting of the transistor 21, the resistors 19, 22 and the diode 20 corresponds in its function to the circuit part shown in FIG. 2B, so that its operation need not be dealt with in detail. The transistor 25 is connected to the positive supply voltage +U1, of, for example, +5 volts, via the resistor 17 and to the negative supply voltage −U2 via the resistor 27. It is controlled at its base via terminal 50. Resistor 16 is located between base and positive supply voltage. Transistor 26 is also controlled via its base. Transistor 26 is followed respectively by a further transistor 21 and a resistor 18 up to the positive supply voltage −U1 and a resistor 28 up the negative supply voltage −U2. The collector line of transistor 25 is connected to the base of transistor 31. The emitter of transistor 31 is connected to the negative supply voltage via the resistor 30.

Because of its lower power dissipation, the circuit illustrated in FIG. 4 is even more suited for integration than that of FIG. 3. Between a positive supply voltage +U1 and a negative supply voltage −U2 a resistor 34, a transistor 36, a resistor 47, and a transistor 46 are series-connected. A resistor 33 is arranged between the positive supply voltage +U1 and the base of transistor 36. Transistor 36 receives its switching signal via terminal 51. The electrode E is connected to the base of transistor 37 via a resistor 38; via a resistor 39, a transistor 41 and a resistor 44 the electrode is connected to the negative supply voltage −U2 and via a resistor 40 and a transistor 43 also to the negative supply voltage −U2. The base of transistor 41 is connected to the line between transistor 36 and resistor 47; the base of transistor 43 is connected to the line arranged respectively between transistor 41 and resistor 44 and between resistor 47 and the transistor 46. The end of the resistor 38 remote from the electrode is connected to the positive supply voltage +U1 via a resistor 35. The end of resistor 35 close to the electrode is connected, via a diode 52, to the emitter of transistor 37 which is connected to ground. Via a resistor 42 and a resistor 45, the collector of transistor 37 is connected to the negative supply voltage —U2, the line between resistors 42 and 45 being connected to the base of transistor 46.

Upon switching on, which is effected in response to the application of a control pulse via terminal 51, a current flows through transistor 36 and resistors 47 and 34. As a result, transistors 41 and 43 become saturated and during the formation of an electrode voltage, transistor 37 becomes conductive for the first time via resistor 38, thus making transistor 46 conductive. Transistor 43 is switched off by the conductive transistor 46, so that only transistor 41 determines the arc current. As transistor 43 is not operated in a Darlington circuit, it can be switched in full to its collector/emitter voltage. (This would be possible with a circuit in accordance with FIG. 3 because of the Darlington configuration of transistors 31 and 32.)

In FIG. 4, the transistor 43 necessitates a high base current which is supplied by transistor 41. Transistor 41 simultaneously supplies the arc current. (This is not the case with transistor 31 in the circuit of FIG. 3, because transistors 31, 32 and 29 have to be separated on principle Darlington circuit.)

To avoid potential oscillations, a capacity may be connected in parallel to resistor 47 in FIG. 3 and resistor 47 and transistor 46 in FIG. 4, respectively.

While the invention has been particularly shown and described with reference to preferred embodiments thereof it will be understood by those skilled in the art that various changes in form and details may be made therein without departing from the spirit and scope of the invention.

What is claimed is:

1. A circuit for controlling the current supplied to an electrode for marking metal coated recording paper comprising:
   means connected to said electrode for supplying arcing current thereof; and
   control means connected to said supply means and the junction of said electrode and said recording paper for varying the arcing current through said supply means in response to the voltage level at said junction.

2. Apparatus as described in claim 1 wherein said supply means has a plurality of paths for supplying said arcing current.

3. A circuit for controlling the current supplied to an electrode for marking metal-coated recording paper during a starting phase and a burning phase comprising:
   means connected to said electrode for supplying a variable rate of current flow to said electrode; and
   control means responsive to an input signal for supplying a first rate of current flow for said starting phase and responsive thereafter to the voltage at said electrode-paper junction for supplying current at a second rate of flow to said electrode during said burning phase.

4. Apparatus as described in claim 3 wherein said supply means has a plurality of parallel paths for said starting current.

5. Apparatus as described in claim 4 further including means in said control means for increasing the impedance in at least one of said plurality of paths to decrease said current flow through said electrode.

6. A circuit for controlling the current to a marking electrode for the metal film of a metallized recording medium comprising:
   current supply means for supplying arcing current for said electrode;
   means for variably energizing said current supply means to erode said metal film; and
   current control means connected to said electrode and said energizing means, and responsive to the voltage level at said electrode-metal film junction for varying the arcing current through said supply means.

7. The method of marking a metallized recording medium with an electrode comprising the steps of:
   supplying current to said electrode sufficient to initiate an arc at the junction of said electrode and said metallized recording medium; and
   reducing the current to said electrode after the initiation of said arc and before the mark is completed on said medium.

8. The method of marking a metallized recording medium with an electrode comprising the steps of:
   supplying current to said electrode at a rate sufficient to produce an arc at the junction of said electrode and said metallized recording medium;
   sensing the voltage at said junction; and
   varying the current flow through said electrode in accordance with the magnitude of said sensed voltage subsequent to the initiation of said arc.

9. The method of claim 8 further comprising supplying current to said electrode along a plurality of paths at a rate sufficient to produce said arc at the junction of said electrode and said recording medium.

10. The method of claim 9 further comprising the step of varying the current flow through said electrode by reducing the current through one of said plurality of paths in accordance with said sensed voltage.

11. A circuit for controlling the current supplied to an electrode for marking metal-coated recording paper comprising:
   means connected to said electrode for supplying marking current therefor; and
   control means connected to said supply means and the junction of said electrode and said recording paper responsive to an input signal to cause said supply means to initially supply the greatest current during an energization phase of said electrode and thereafter responsive to the voltage level at said junction for varying the current through said supply means in response to said voltage level.

12. Apparatus as described in claim 11 wherein said control means decreases the current provided by said supply means as the magnitude of said voltage level at said junction increases.

13. Apparatus as described in claim 11 wherein said current supply means includes a Darlington pair of transistors.

* * * * *